United States Patent Office 3,380,521
Patented Apr. 30, 1968

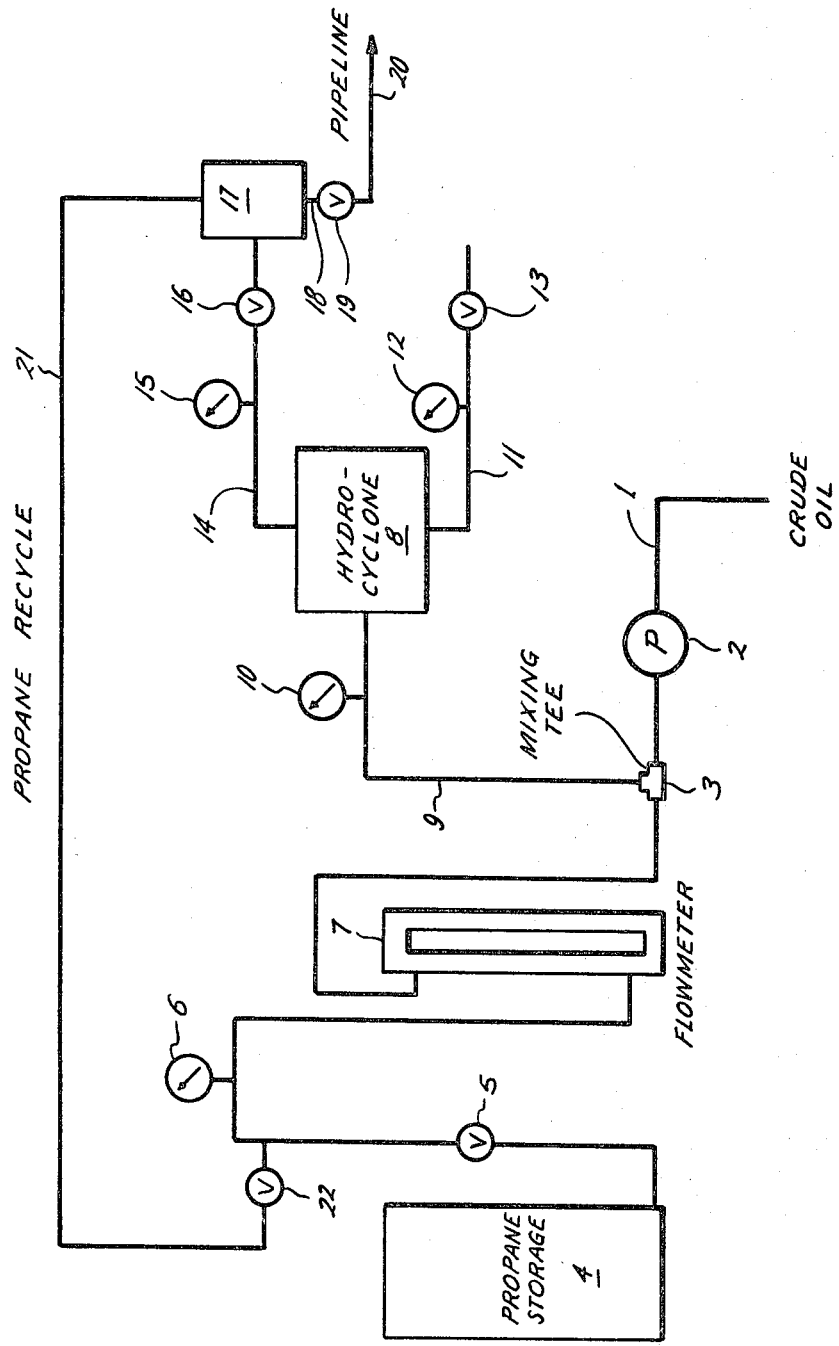

3,380,521
SECONDARY RECOVERY OF CRUDE OIL
Robert H. Friedman, Houston, Tex., assignor, by mesne assignments, to Getty Oil Company, Los Angeles, Calif., a corporation of Delaware
Filed July 26, 1965, Ser. No. 474,809
14 Claims. (Cl. 166—8)

ABSTRACT OF THE DISCLOSURE

A process for the recovery of crude oil involves separating an asphaltic fraction from the crude oil, using a portion of the crude resulting from the separation to generate steam, and employing the steam in the recovery of the crude oil from the formation. The deasphalted crude oil can be transported to a refinery more easily, and the separated asphaltic fraction is a relatively cheap source of heat for enhancing the recovery process.

---

This invention relates to the secondary recovery of crude oil. More particularly, it relates to a method for rendering low-gravity crude oil adaptable for transportation through a pipeline, and for supplying an inexpensive source of fuel at the well-head suitable for use in the secondary recovery of the oil in the ground.

Briefly, the invention comprises a continuous process suitable for the secondary recovery of crude oil from the field in which the crude is being produced including mixing the crude oil with sufficient solvent to form a separable mixture, and passing the mixture into a separator whereby the asphaltic fraction is removed from the mixture. It is contemplated that this asphaltic fraction will be employed to generate a hot medium which will then be injected into the ground, whereupon additional production of crude oil will be realized.

In another embodiment, the invention comprises a continuous process suitable for the secondary recovery of crude oil including the steps of recovering crude oil from a producing formation, mixing this crude oil with a solvent such as propane to form a mixture, separating the asphaltic fraction from the mixture in a hydrocyclone, transferring the deasphalted crude oil to a pipeline for transport to a refinery, burning the asphaltic fraction to generate steam, injecting the steam thus produced into the producing formation, and thereby recovering additional crude oil from the formation.

In yet another embodiment, the invention comprises a continuous process suitable for the removal in a field producing low gravity crude oil, of an asphaltic fraction from the crude oil including the steps of mixing the crude oil with a sufficient solvent to form a separable mixture, preheating the mixture to a temperature sufficient to enhance separation of the asphaltic fraction, separating the asphaltic fraction from the mixture in a hydrocyclone, transferring the asphaltic fraction to a burner for the generation of steam for use in secondary recovery from the field, separating the solvent from the deasphalted crude oil, and transferring the deasphalted crude oil to a pipeline for transport to a refinery.

In order that the invention can be understood in detail, one advantageous embodiment of the invention will be described with reference to the accompanying drawings, which form a part of this specification.

Referring now to the flow sheet, there is illustrated a continuous process for the removal of the asphaltic fraction of a crude oil, in the field wherein the crude oil is being produced.

While other crude oils might be employed in the process of this invention, the invention has been found of maximum utility wherein the crude is a low gravity crude (below about 14° A.P.I.) and wherein the first distillable fraction is equivalent to at least $C_{10}$, and wherein this fraction amounts to a small percentage of the total amount of crude. In other words, those crudes which are most useful in this invention are those which do not begin to boil until about 200° C. Such crudes are found to occur, among other places, in the Kern River and Paris Valley areas of California.

As illustrated in this embodiment, crude oil enters conduit 1 from the well and is pumped by means such as oil pump 2 into mixing means, such as mixing T 3, wherein the oil is thoroughly mixed with a solvent such as propane. Propane make-up may enter the mixing T 3 from propane storage tank 4 through suitable flow control means, such as valve 5, and means for measuring the pressure, as pressure gauge 6; means for measuring the flow, such as flowmeter 7, are also desirably included in the propane line system. About 2–4 volumes of propane enter mixing T 3 per volume of crude oil. Of course, more propane could be used but it is desirable from an economic viewpoint to keep the propane-to-crude ratio at a minimum.

After the propane and the crude oil have been thoroughly mixed at 3, the mixture is passed into means for separating out the asphalt fraction. Such means may conveniently take the form of a centrifuge or hydrocyclone 8. As will be readily recognized, it will be advantageous to include in conduit 9 containing the crude oil-propane mixture, means for measuring pressure such as the gauge 10.

Any number of suitable hydrocyclone units may be employed to separate the high boiling asphaltic fraction from the propane-crude oil mixture. Particularly preferred is a hydrocyclone manufactured by Dorr-Oliver Inc., of Stamford, Conn., for example the unit sold under the trademark Doxie. This hydrocyclone includes six cyclones, each 10 mm. in diameter, mounted in parallel in a single stainless steel housing.

The use of hydrocyclones for this separation has proved to be particularly advantageous. Other than the obvious advantages which this type of machine possesses, such as lack of moving parts, it has been found that, when employed in this particular process, an entirely unexpected throughput is possible and residence time in the hydrocyclone is only on the order of one-tenth second. Hence, a much smaller amount of solvent make-up than customary is necessary, and the separation is unusually good.

It will be understood that the quantity of the asphaltic fraction for any given amount of mixture which will be removed in the bottoms from the hydrocyclone will depend on the temperature at which the separation is made. It has been found distinctly advantageous to preheat the crude oil-propane mixture entering the hydrocyclone to between about 120° F. and about 210° F. This will yield a bottom cut ranging between 1% and 30%, as desired, for certain low gravity crudes produced from fields in the Kern River area of California.

The heavy asphaltic bottoms are removed from the hydrocyclone through conduit 11 which conveniently includes a pressure gauge 12 and suitable flow control means such as valve 13. The bottoms are then transferred to equipment for the generation of a hot medium such as steam, for example a boiler (not shown), where the asphaltic bottoms are used as fuel. The medium thus generated is then injected into the formation, and additional crude oil is produced from the field. This is commonly called "secondary recovery."

While "secondary recovery" as used herein generally refers to that recovery, by some artificial process, after there has been a primary recovery from the field, it is here noted that in some fields, "secondary recovery" is actually the primary recovery. That is, the crude oil is so viscous that there is little if any recovery using the conventional methods. Thus, secondary recovery techniques are employed, and some recovery—which in this case is the *first* recovery—is realized. Thus, "secondary recovery" as used in this specification and the appended claims, unless otherwise specified, refers to the use of secondary recovery *techniques;* and this term may, in some instances, actually include primary, as well as secondary, recovery.

The deasphalted liquid from hydrocylone 8 passes into conduit 14 and then conveniently trough an overflow pressure and temperature gauge 15, and thence through flow control means such as valve 16 into a separator 17.

Separator 17 divides the crude oil-propane mixture flowing in conduit 14 into its two components, i.e., crude oil and propane. Crude oil flows, through conduit 18 and flow control means such as valve 19, into pipeline 20 for transportation to the refinery. Propane flows into conduit 21 where it is recycled through flow control means such as valve 22 to mix with the propane make-up from storage tank 4.

While the example has been in terms of propane as the solvent, it will be readily recognized that other solvents suitable for deasphalting might be used instead. For example, butane, pentane, L.P.G., and mixtures thereof, have been found useful as the solvent.

The invention, one embodiment of which has been described in detail above, has been found to yield many significant advantages over the prior art, and unexpected results and solutions to many of the difficulties which have faced the industry when confronted with crude oil fields having a high asphaltic content.

Secondary recovery has been increasingly practiced during the last few years in order to obtain the maximum amount of production of crude oil from a field. Various methods of secondary recovery have been used, one of the greatly advantageous methods including the injection of a hot medium such as steam into the formation. A difficulty has existed, however, in that such a medium must, as a matter of economics, be generated at the wellhead. Such a medium has been generated by combustion of natural gas which may be available at the well-head, or by combustion of the crude oil itself. It is readily seen that this invention, however, provides a much less expensive fuel, namely the asphaltic fraction of the crude, for generation of this hot medium. The distinctly advantageous result, of course, is greatly increased efficiency in the techniques of secondary recovery.

It has also been found that the asphaltic fraction tends to precipitate in the pipeline, and this fact has necessitated heating of the pipeline all the way from the field to the refinery. This, as is readily seen, is an extremely expensive and cumbersome task, which leaves the line subject to technical difficulties and increased maintenance expense long after installation. Since the asphaltic fraction is removed before transport of the oil to the refinery in the practice of this invention, however, this great additional expense is advantageously avoided.

A by-product of crude oil of high asphaltic content, a type of coke, is produced at refineries processing such crude oil. This by-product, which is for all practical purposes worthless, is usually allowed to accumulate in waste deposits at the refinery. These deposits continue to grow and occupy more and more valuable land and to create a nuisance. It has been quite unexpectedly found, however, that employment of this invention virtually eliminates any such undesirable by-product.

Another difficulty has been that pipeline capacity is limited, and a relatively large amount of this capacity has been taken up by the relatively unimportant asphaltic fraction. That is, the relatively high viscosity of the oil diminishes the effective capacity of the pipeline. This invention allows maximum recovery from the pipeline of more commercially valuable portions of the crude by reducing the viscosity to a fraction of its original value.

Still further, it has been found that practice of this invention results in the recovery at the pipeline of a crude much more valuable than the crude as it comes from the field. The A.P.I. gravity of a crude has been found to be increased, for one example, from 13° A.P.I. to 18° A.P.I., by the method of this invention. This higher-gravity oil is, of course, of much greater value than the low gravity crude.

The asphalt constituents of many oils contain a high metal fraction, and some of these metals, e.g. vanadium, are commercially valuable. As a further advantageous feature of this invention, these metals may be conveniently extracted from the ash which results from the burning of the asphalt.

While the invention has been described in terms of a particularly useful embodiment, it will be recognized by those skilled in the art that various modifications might be made herein without departing from the scope hereof.

I claim:

1. A continuous process for the recovery of crude oil comprising the steps of:
   recovering crude oil from a producing formation,
   contacting the crude oil with sufficient solvent to form a separable mixture,
   separating an asphaltic fraction from the mixture,
   burning a crude portion resulting from the separation to heat a hot medium, injecting the hot medium into said formation, and
   recovering additional oil from said formation.

2. A continuous process suitable for the secondary recovery of crude oil comprising the steps of:
   recovering crude oil from a producing formation,
   mixing at least a portion of said crude oil with sufficient solvent to form a separable mixture,
   separating an asphaltic fraction from said mixture,
   burning a crude portion resulting from the separation to generate steam,
   injecting the steam thus produced into said producing formation, and
   recovering additional crude oil from said formation.

3. A continuous process suitable for the secondary recovery of crude oil comprising the steps of:
   recovering crude oil from a producing formation,
   mixing said crude oil with sufficient solvent to form a separable mixture,
   separating an asphaltic fraction from the mixture in a hydrocyclone,
   burning a crude portion resulting from the separation to generate steam,
   injecting the steam thus produced into said producing formation, and
   recovering additional crude oil from said formation.

4. A continuous process suitable for the secondary recovery of crude oil comprising the steps of:
   recovering crude oil from a producing formation,
   mixing said crude oil with propane to form a separable mixture,
   separating an asphaltic fraction from the mixture,
   burning a crude portion resulting from the separation to generate steam,
   injecting the steam thus produced into said producing formation, and
   recovering additional crude oil from said formation.

5. A continuous process suitable for the secondary recovery of crude oil comprising the steps of:
   recovering crude oil from a producing formation,
   mixing said crude oil with sufficient solvent to form a separable mixture,
   separating an asphaltic fraction from said mixture,
   transferring the deasphalted crude oil to a pipeline for transport to a refinery,
   burning said asphaltic fraction to generate steam,
   injecting the steam thus produced into said producing formation, and
   recovering additional crude oil from said formation.

6. A continuous process suitable for the secondary recovery of crude oil comprising the steps of:

recovering crude oil from a producing formation,
mixing said crude oil with propane to form a separable mixture,
separating an asphaltic fraction from the mixture,
transferring the deasphalted crude oil to a pipeline for transport to a refinery,
burning said asphaltic fraction to generate steam,
injecting the steam thus produced into said producing formation, and
recovering additional crude oil from said formation.

7. In a continuous process of recovering crude oil from a producing formation, the steps of:
contacting crude oil prior to its transport to a refinery with sufficient solvent to form a separable mixture,
separating an asphaltic fraction from the mixture,
transferring the asphaltic fraction to a burner for the generation of a hot medium, employing said medium in said process, and
transferring the deasphalted crude oil to a pipeline for transport to a refinery.

8. In a continuous process of recovering crude oil from a producing formation, the steps of:
contacting the crude oil prior to its transport to a refinery with sufficient solvent to form a separable mixture,
separating an asphaltic fraction from the mixture,
transferring the asphaltic fraction to a burner for the generation of steam, employing said steam in said process, and
transferring the deasphalted crude oil to a pipeline for transport to a refinery.

9. In a continuous process of recovering crude oil from a producing formation, the steps of:
mixing crude oil with sufficient solvent to form a separable mixture,
preheating the mixture to a temperature sufficient to enhance separation of an asphaltic fraction,
separating the asphaltic fraction from the mixture,
transferring the asphaltic fraction to a burner for generation of steam, employing the steam in said process,
separating the solvent from the deasphalted crude oil, and
transferring the deasphalted crude oil to a pipeline for transport to a refinery.

10. In a continuous process of recovering crude oil from a producing formation, the steps of:
mixing crude oil with sufficient solvent to form a separable mixture,
preheating the mixture to about 120° F. to about 210° F.,
separating an asphaltic fraction from the mixture,
transferring the asphaltic fraction to a burner for generation of a hot medium, employing the hot medium in said process,
separating the solvent from the deasphalted crude oil, and
transferring the deasphalted crude oil to a pipeline for transport to a refinery.

11. In a continuous process of recovering crude oil from a producing formation, the steps of:
recovering crude oil from the producing formation,
mixing the crude oil with propane to form a separable mixture,
separating an asphaltic fraction from the mixture,
transferring the asphaltic fraction to a burner for the generation of steam, employing the steam for enhancing recovery,
separating propane from the deasphalted crude oil, and
transferring the deasphalted crude oil to a pipeline for transport to a refinery.

12. In a continuous process of recovering crude oil from a producing formation, the steps of:
recovering crude oil from the producing formation,
mixing said crude oil with propane to form a separable mixture,
preheating the mixture to about 120° F. to about 210° F.,
separating an asphaltic fraction from the mixture,
transferring the asphaltic fraction to a burner for the generation of steam, employing the steam for enhancing recovery,
separating propane from the deasphalted crude oil, and
transferring the deasphalted crude oil to a pipeline for transport to a refinery.

13. In a continuous process of recovering crude oil from a producing formation, the improvement comprising:
mixing in the field containing the producing formation, crude oil recovered from said formation with sufficient solvent to form a separable mixture,
transferring said mixture into separator means in said field wherein an asphaltic fraction is removed from said mixture and a deasphalted fraction having viscosity lower than said crude oil is formed,
transferring the asphaltic fraction to a location for processing, and
transferring the deasphalted fraction to a pipeline in the field which communicates with a refinery or other location for processing, whereby precipitation of asphaltic material in said pipeline is reduced and the effective capacity of the pipeline is enhanced.

14. A process for the recovery of crude oil containing an asphaltic fraction, which process comprises:
recovering crude oil from a formation,
mixing said crude oil with sufficient propane to form a separable mixture containing between about two and about four liquid volumes of propane per liquid volume of crude oil,
heating the mixture to a temperature between about 120° F. and about 210° F. sufficient to enhance separation of the asphaltic fraction,
separating at least a portion of the asphaltic fraction from the mixture to form deasphalted crude oil,
burning the separated asphaltic fraction to generate steam,
employing the steam in the recovery of crude oil,
separating propane from the deasphalted crude oil, and
transferring the resulting deasphalted crude oil for transport to a refinery.

References Cited

UNITED STATES PATENTS

| | | | |
|---|---|---|---|
| 895,612 | 8/1908 | Baker | 166—11 X |
| 2,173,556 | 9/1939 | Hixon | 166—11 |
| 3,159,571 | 12/1964 | Reman et al. | 208—39 X |
| 3,237,692 | 3/1966 | Wallace et al. | 166—40 |
| 3,303,122 | 2/1967 | Doelman | 208—45 |

OTHER REFERENCES

The Condensed Chemical Dictionary, 6th Edition, Reinhold Publishing Corporation, New York (1961).

STEPHEN J. NOVOSAD, *Primary Examiner.*